United States Patent [19]
Sakai

[11] Patent Number: 5,812,770
[45] Date of Patent: Sep. 22, 1998

[54] ELECTRONIC MAIL SYSTEM WITH SORTING FUNCTION OF DESTINATION ADDRESS IN ACCORDANCE WITH RECEPTION FREQUENCY DATA

[75] Inventor: Masato Sakai, Tokyo, Japan

[73] Assignee: Kabushiki Kaisha Toshiba, Kawasaki, Japan

[21] Appl. No.: 430,255

[22] Filed: Apr. 28, 1995

Related U.S. Application Data

[63] Continuation of Ser. No. 913,715, Jul. 16, 1992.

[30] Foreign Application Priority Data

Jul. 16, 1991 [JP] Japan ................................... 3-175379

[51] Int. Cl.⁶ ............................. G06F 13/00; G06F 13/14
[52] U.S. Cl. ...................................................... 395/200.16
[58] Field of Search ........................ 395/200.01, 200.04, 395/200.16

[56] References Cited

U.S. PATENT DOCUMENTS

| | | | |
|---|---|---|---|
| 4,760,572 | 7/1988 | Tomikawa | 370/94.1 |
| 5,040,141 | 8/1991 | Yazima et al. | 364/400 |
| 5,051,944 | 9/1991 | Fetterolf et al. | 395/184.01 |
| 5,109,519 | 4/1992 | Zimmet et al. | 395/800 |
| 5,123,089 | 6/1992 | Beilinski et al. | 395/200 |
| 5,220,596 | 6/1993 | Patel | 379/94 |
| 5,261,052 | 11/1993 | Shimamoto et al. | 395/200 |
| 5,287,456 | 2/1994 | Rhodes et al. | 395/200 |
| 5,287,498 | 2/1994 | Perelman et al. | 395/600 |

*Primary Examiner*—Parshotam S. Lall
*Assistant Examiner*—Kenneth R. Coulter
*Attorney, Agent, or Firm*—Cushman, Darby & Cushman IP Group of Pillsbury Madison & Sutro LLP

[57] ABSTRACT

In an electric mail system, when an electric mail is received from another electric mail system, source data is extracted from the electric mail, and it is checked whether destination data identical to the source data is stored in a destination data file. If no identical destination data is stored in the destination data file, the source data is stored, as destination data, in the destination data file, and reception frequency data indicting the reception frequency of the electric mail is generated. In contrast to this, if identical destination data is stored in the destination data file, the reception frequency data is updated. Every time an electric mail is received, the destination data stored in the destination data file are sorted in accordance with reception frequency data. When an electric mail is to be transmitted, retrieval is performed with respect to the destination data file and the destination database to select predetermined destination data. The selected destination data is added to the electric mail to be transmitted.

13 Claims, 8 Drawing Sheets

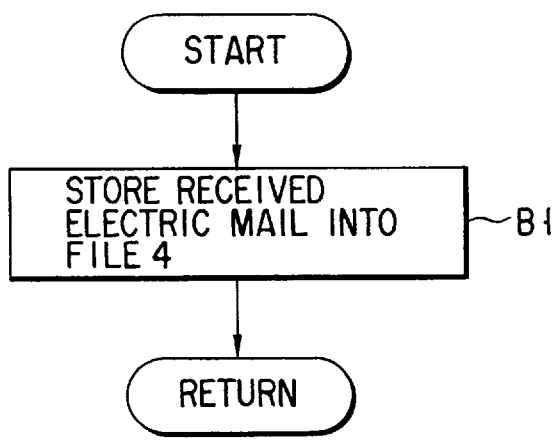
F I G. 3
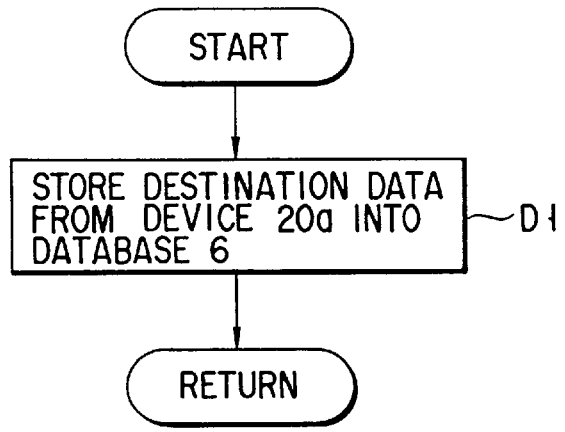
F I G. 5

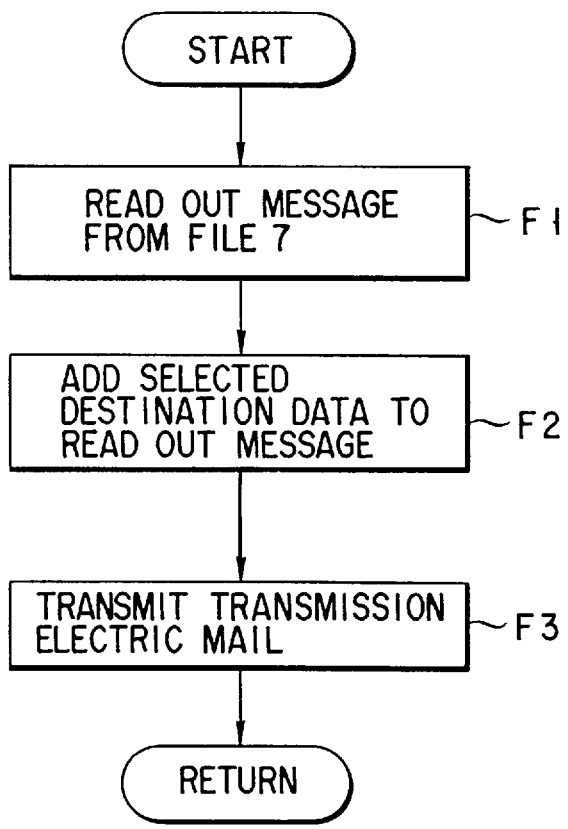
F I G. 7

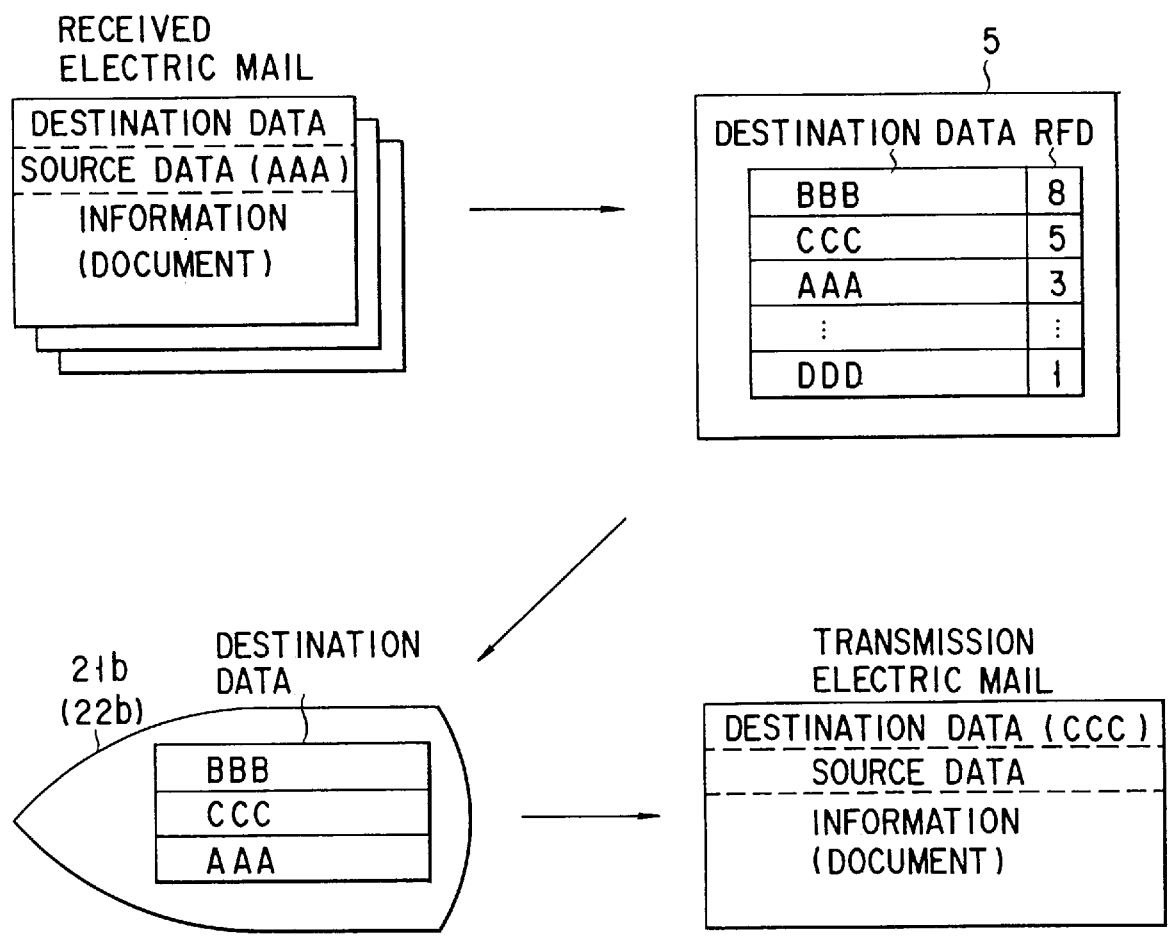
F I G. 8

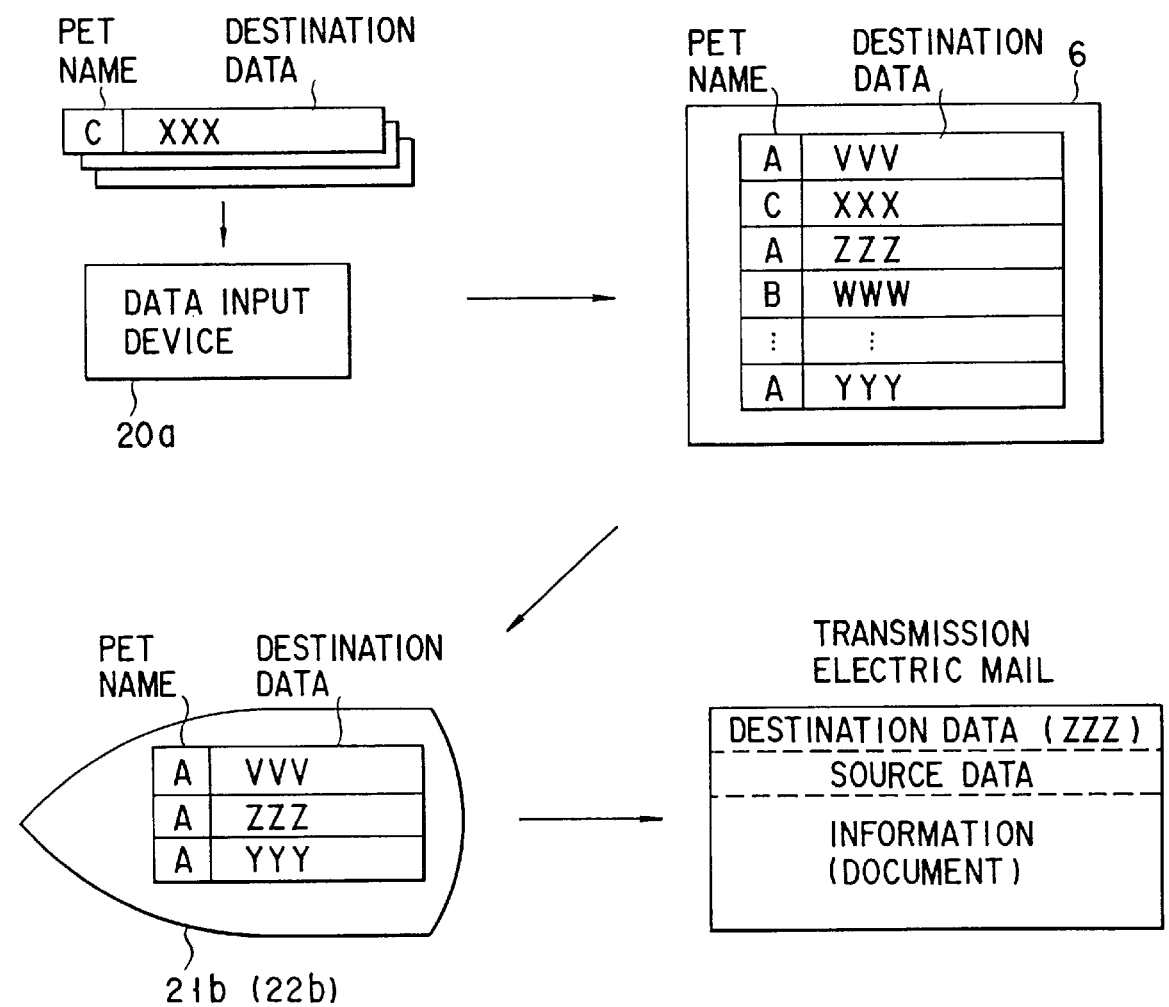
F I G. 9

ELECTRONIC MAIL SYSTEM WITH SORTING FUNCTION OF DESTINATION ADDRESS IN ACCORDANCE WITH RECEPTION FREQUENCY DATA

This is a continuation of application Ser. No. 07/913,715, filed on Jul. 16, 1992 which was abandoned upon the filing hereof.

BACKGROUND OF THE INVENTION

1. Field of the Invention

The present invention relates to an electronic mail system.

2. Description of the Related Art

An electronic mail system is a system for delivering messages (electronic mails) by using a computer network or a local area network (LAN) as a communication network. This system is used as a kind of electronic post-office box service. In the electronic mail system, a message is input from a telex terminal to a mail box (corresponding to a post-office box) set in a magnetic disk device or the like at each terminal. If a message is received by a mail box, the message is displayed on a display device at a terminal such as a teletex or facsimile or is printed out by a printer in accordance with an operation of an operator.

In such an electronic mail system, destination data indicating destinations to which messages are to be transmitted are stored beforehand in a storage device of a computer system arranged at each terminal. When a message is transmitted, predetermined destination data is selected from the destination data stored in the storage device.

In this manner, in the electronic mail system, destination data indicating destinations to which messages are to be transmitted are prestored in the storage device so that an operator need not input destination data for transmission of every message as in a normal mailing operation in which a destination is written on a postal card or an envelope. Therefore, the operating efficiency of the operator in transmission of messages can be improved.

In this electronic mail system, however, since destination data for transmitting messages must be stored in a storage device or the like in advance, an input operation of destination data is a very cumbersome work for the operator. In addition, since an update operation of stored destination data also takes much time, an update process of destination data is often delayed. Therefore, stored destination data cannot be efficiently used.

Furthermore, with an increase in number of destination data stored in a storage device or the like, a retrieval operation takes a longer time. For example, in MOTIS (message oriented text interchange systems) as electronic mail standards in an electric mail system (OSI (open system interchange)) based on ISO (international organization standardization), one destination data consists of 256 bytes or more. In retrieval of destination data, it is difficult to directly designate destination data having such a long date length. For this reason, a pet name or the like is added to such destination data, and retrieval of destination data is performed on the basis of this pet name. However, in the method of retrieving a pet name, and designating destination data corresponding the pet name, the procedure is inevitably complicated, and it takes much time to access a database in which destination data are stored.

As described above, in the conventional electronic mail system, it requires much labor to perform storage of destination data and retrieval of destination data in transmission of a message.

Under the circumstances, demands have arisen for an electronic mail system which can efficiently store and retrieve destination data which are added to messages (electronic mails) to be transmitted.

SUMMARY OF THE INVENTION

It is an object of the present invention to provide an electronic mail system which can efficiently store and retrieve destination data which are added to electronic mails to be transmitted.

According to the present invention, there is provided an electronic mail system comprising means for receiving electronic mails having source data, extracting means for extracting the source data from the received electronic mails, destination data storage means for storing the extracted source data as destination data, electronic mail storage means for storing an electronic mail to be transmitted, selecting means for selecting predetermined destination data from the stored destination data, and means for reading out the stored electronic mail, adding the selected predetermined destination data to the readout electronic mail, and transmitting the electronic mail to which the predetermined destination data is added.

In addition, according to the present invention, there is provided an electronic mail transmission/reception method comprising the steps of receiving electronic mails having source data, extracting source data from the received electronic mails, storing the extracted source data as destination data, storing an electronic mail to be transmitted, selecting predetermined destination data from the stored destination data, reading out a stored electronic mail, adding the selected predetermined destination data to the readout electronic mail, and transmitting the electronic mail to which the predetermined destination data is added.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out in the appended claims.

BRIEF DESCRIPTION OF THE DRAWINGS

The accompanying drawings, which are incorporated in and constitute a part of the specification, illustrate a presently preferred embodiment of the invention, and together with the general description given above and the detailed description of the preferred embodiment given below, serve to explain the principles of the invention.

FIG. 3 is a flow chart showing an electronic mail reception process in the flow chart of the electronic mail transmission/reception process in FIG. 2;

FIG. 5 is a flow chart showing a destination data input process in the flow chart of the electronic mail transmission/reception process shown in FIG. 2;

FIG. 7 is a flow chart showing an electronic mail transmission process in the flow chart of the electronic mail transmission/reception process shown in FIG. 2; and FIGS. 8 and 9 are diagrams explaining the electronic mail transmission/reception process of the electronic mail system.

DETAILED DESCRIPTION OF THE PREFERRED EMBODIMENTS

An embodiment of the present invention will be described below with reference to the accompanying drawings.

Figure 1:
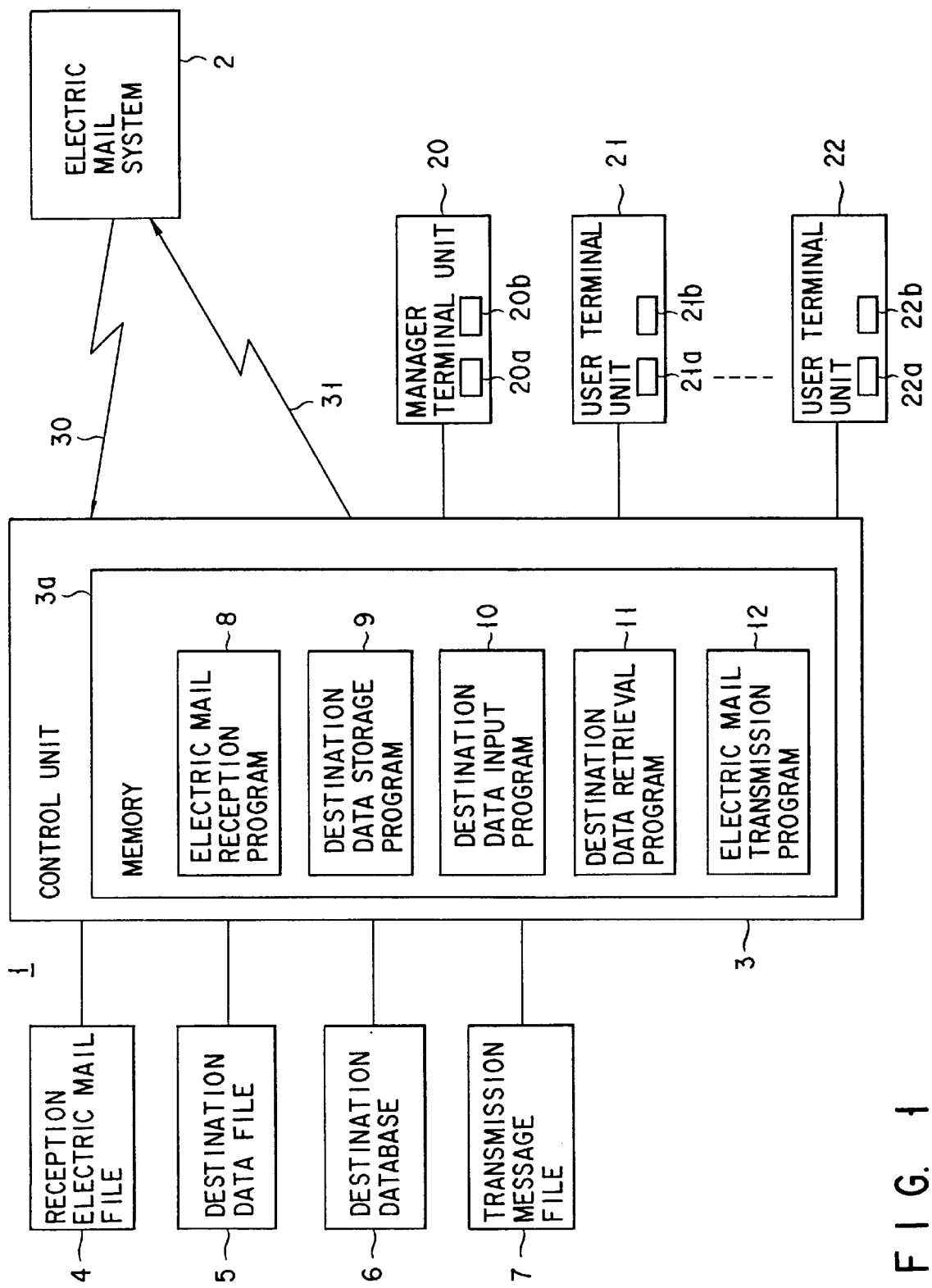
FIG. 1 is a block diagram showing the arrangement of an electronic mail system according to an embodiment of the present invention.

FIG. 1 is a block diagram showing the arrangement of an mail electronic system according to an embodiment of the present invention. Referring to FIG. 1, an electronic mail system 1 comprises a control processor 3, a reception electronic mail file 4, a destination data file 5, a destination database 6, a transmission electronic mail file 7, a console 20, and a display device 21. Note that an electronic mail system 2 may have the same arrangement as that of the electronic mail system 1 of this embodiment of the present invention or the conventional electronic mail system. The electronic mail systems 1 and 2 are connected to each other through a reception line 30 and a transmission line 31.

The control processor 3 has a memory 3a. The memory 3a serves to store an electronic mail reception program 8, a destination data storage program 9, a destination data input program 10, a destination data retrieval program 11, and an electronic mail transmission program 12. The control processor 3 performs an electronic mail reception process, a destination data storage process, a destination data input process, a destination data retrieval process, and an electronic mail transmission process in accordance with the respective programs stored in the memory 3a.

When an electronic mail is transmitted from the electronic mail system 2 to the electronic mail system 1, the electronic mail reception program 8 is used to receive the electronic mail and store it into the reception electronic mail file 4.

The destination data storage program 9 is used to extract source data from received electronic mails, store the extracted source data, as destination data, in the destination data file 5, generate reception frequency data indicating the frequency of reception of each data, and sort the destination data stored in the destination data file 5 in accordance with the generated reception frequency data.

When destination data is input by an operator through the console 20, the destination data input program 10 is used to store the destination data into the destination database 6. Note that a pet name is added to this destination data.

When transmission of an electronic mail is requested by the operator, the destination data retrieval program 11 is used to perform retrieval and selection of predetermined destination data with respect to the destination data file 5 and the destination database 6.

The electronic mail transmission program 12 is used to add predetermined destination data, retrieved and selected by the destination data retrieval program 11, to an electronic mail stored in the transmission electronic mail file 7, and transmit the electronic mail having this predetermined destination data added thereto to the electronic mail system 2.

The reception electronic mail file 4 stores an electronic mail received by the control processor 3. The destination data file 5 stores the source data, as destination data, from the received electronic mail. The destination database 6 stores destination data input by the operator through the console 20. The transmission electronic mail file 7 stores the electronic mail to be transmitted to the electronic mail system 2.

The display device 21 displays destination data stored in the destination data file 5 in an electronic mail transmission process.

An electronic mail transmission/reception process performed by the control processor 3 in the electronic mail system 1 of the embodiment of the present invention will be described below with reference to FIGS. 2 to 7.

Figure 2:
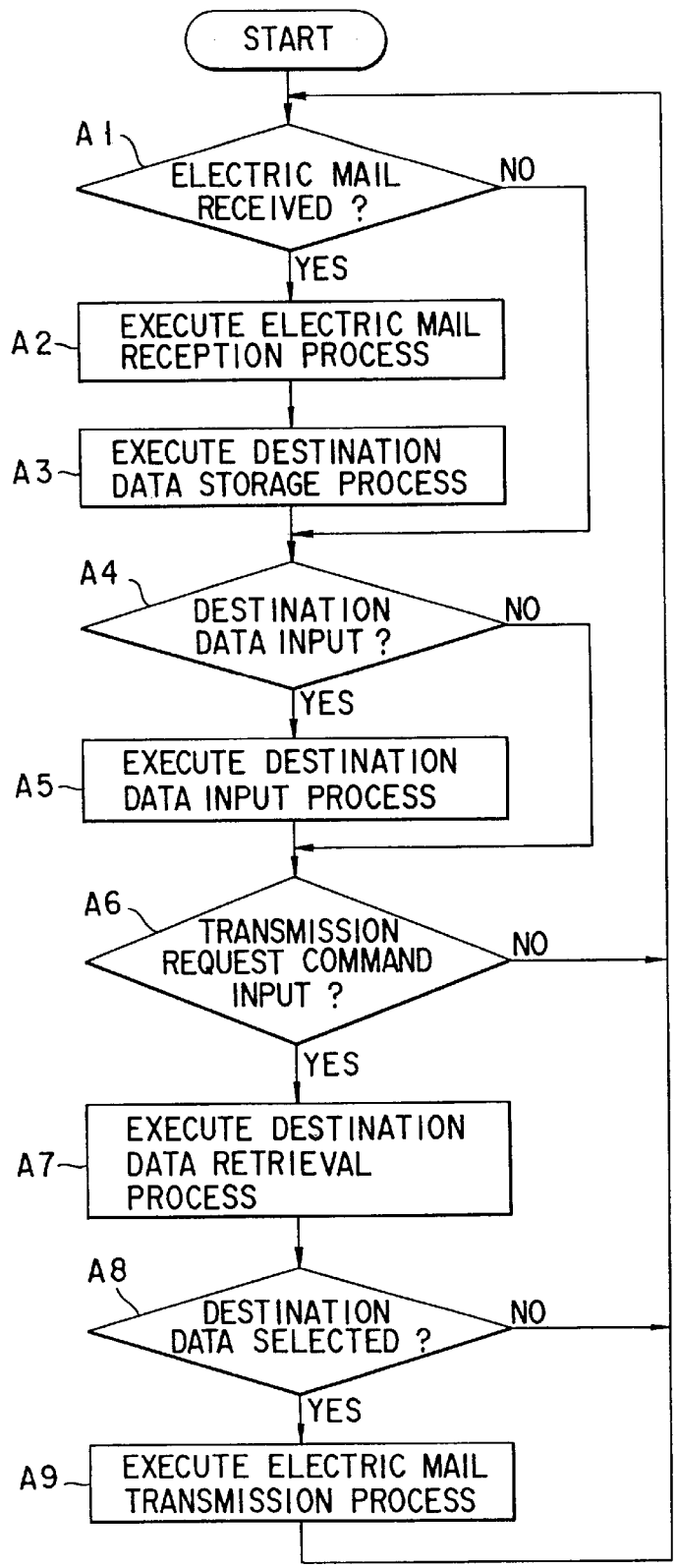
FIG. 2 is a flow chart showing an electronic mail transmission/reception process performed by a control processor of the electronic mail system.

Referring to FIG. 2, it is checked in step A1 whether an electronic mail from the electronic mail system 2 is received by the control processor 3 of the electronic mail system 1 through the reception line 30.

If YES in step A1, an electronic mail reception process is performed in accordance with the electronic mail reception program 8 in step A2. That is, as shown in FIG. 3, the received electronic mail is stored in the reception electronic mail file 4 (step B1).

Figure 4:
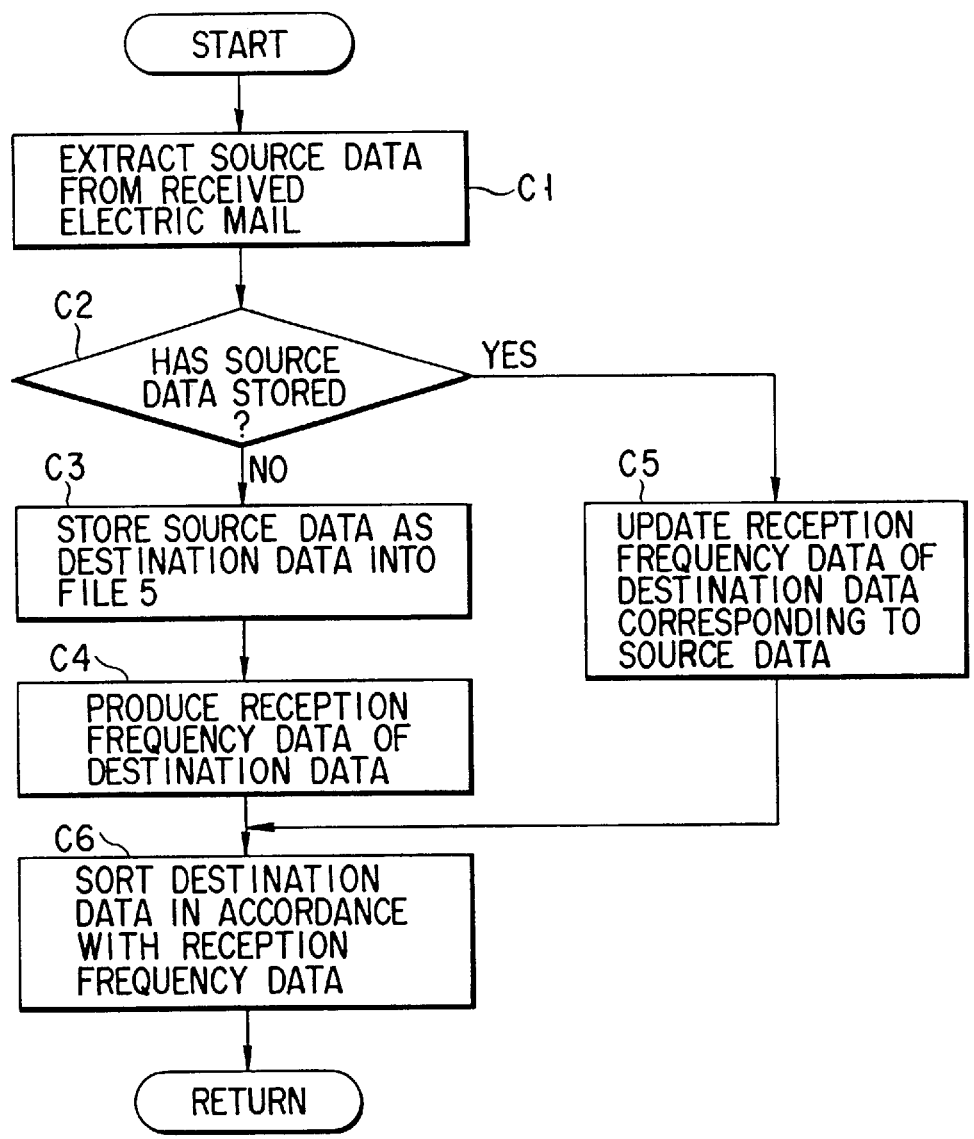
FIG. 4 is a flow chart showing a destination data storage process in the flow chart of the electronic mail transmission/reception process shown in FIG. 2.

In step A3, a destination data storage process is performed in accordance with the destination data storage program 9. That is, as shown in FIG. 4, source data is extracted from the received electronic mail in step C1. In step C2, it is checked whether the extracted source data has already been stored in the destination data file 5.

If NO in step C2, the source data is stored, as destination data, in the destination data file 5 (step C3). In step C4, reception frequency data indicating the reception frequency of electronic mails associated with the destination data stored in the destination data file 5 is produced (step C4).

If YES in step C2, the reception frequency data of the destination data corresponding to the source data is updated (step C5).

In step C6, the destination data stored in the destination data file 5 are sorted in accordance with the reception frequency data. For example, if a count indicated by reception frequency data is incremented every time the same destination data is stored, the destination data are sorted in the descending order of the counts indicated by the reception frequency data.

In step A4, it is checked whether destination data to which a pet name is added by the operator through the console 20 is input. If YES in step A4, a destination data input process is performed in accordance with the destination data input program 10 (step A6). That is, as shown in FIG. 5, the destination data having the pet name input through the console 20 is stored in the destination database 6 (step D1).

In step A6, it is checked whether a transmission request command indicating an electronic mail transmission request is input by the operator through the console 20 to transmit an electronic mail from the electronic mail system 1 to the electronic mail system 2.

If YES in step A6, a destination data retrieval process is performed in accordance with the destination data retrieval program 11 (step A7).

Figure 6:
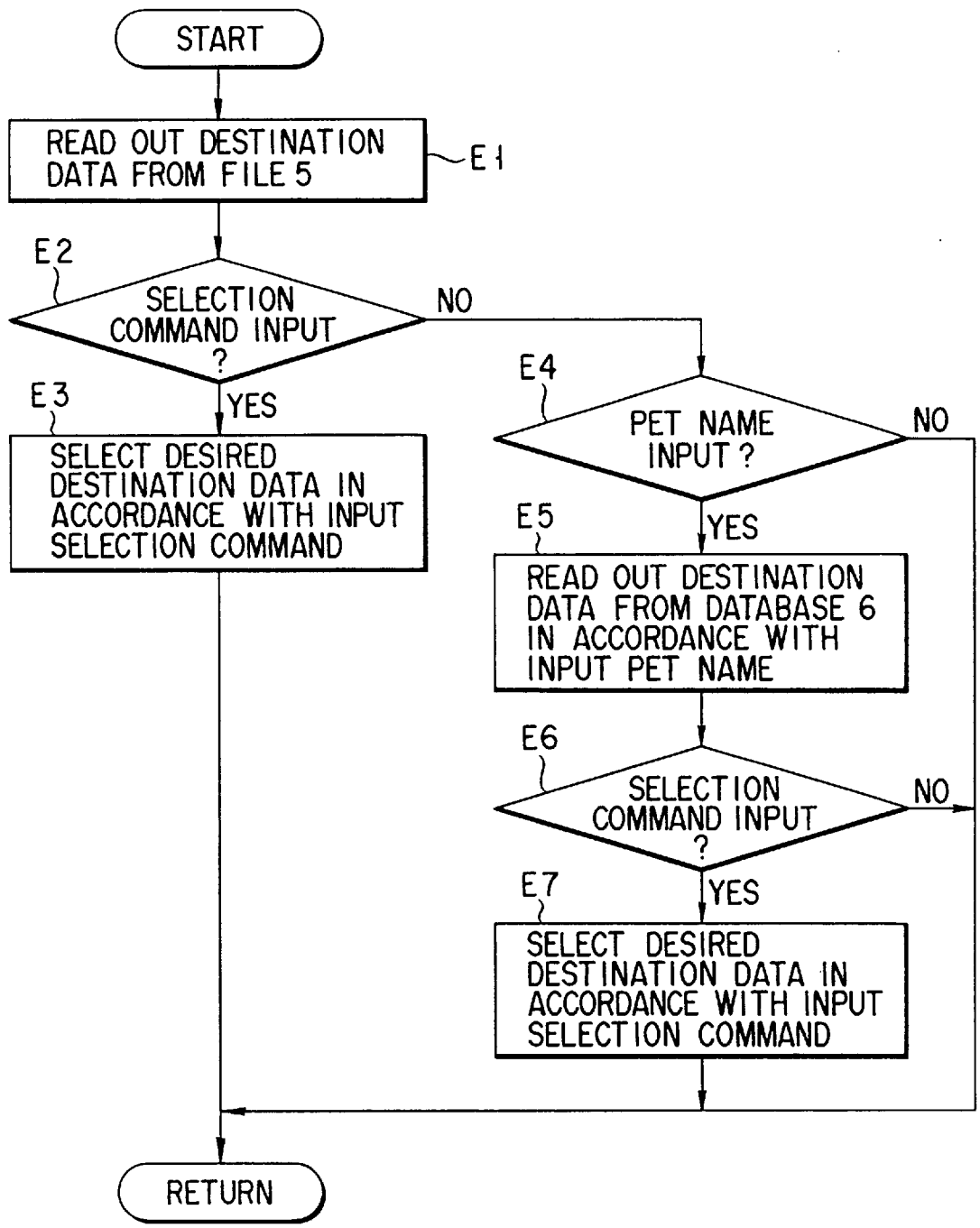
FIG. 6 is a flow chart showing a destination data retrieval process in the flow chart of the electronic mail transmission/reception process shown in FIG. 2.

More specifically, as shown in FIG. 6, the destination data are read out from the destination data file 5 in step E1. The readout destination data are displayed by the display device 21. In step E2, it is checked whether a selection command is input by the operator through the console 20 to select predetermined destination data from the destination data displayed by the display device 21.

If YES in step E2, the predetermined destination data is selected in accordance with the selection command (step E3). This destination data is added to the electronic mail in an electronic mail transmission process to be described later.

If NO in step E2, it is determined that no destination data required for the transmission electronic mail is stored in the destination data file 5. Therefore, in step E4, it is checked whether a pet name is input by the operator through the console 20.

If YES in step E4, destination data is retrieved from the destination database 6 in accordance with the pet name (step E5). In step E6, it is checked whether predetermined destination data corresponding to the input pet name is stored in the destination database 6.

If YES in step E6, the predetermined destination data is selected as destination data to be added to the transmission electronic mail (step E7).

In step A8, it is checked whether destination data to be added to the transmission electronic mail is selected by the destination data retrieval process in step A7. If YES in step A8, an electronic mail transmission process is performed in accordance with the electronic mail transmission program 12 (step A9).

More specifically, as shown in FIG. 7, the transmission electronic mail is read out from the transmission electronic mail file 7 (step F1). The destination data selected by the destination data retrieval process in step A7 is added to the readout transmission electronic mail (step F2). In step F3, the transmission electronic mail to which the destination data is added is transmitted from the electronic mail system 1 to the electronic mail system 2 through the transmission line 31.

As has been described above, according to the present invention, since the source data, of reception electronic mails, used as destination data at high probability can be automatically stored as destination data, the process of storing the source data of reception electronic mails as destination data can be omitted.

In addition, the stored destination data are sorted in the descending order of reception frequency so as to be arranged in the descending order of probability of use. Therefore, data retrieval can be effectively performed.

Although the particular embodiment of the present invention has been described above, the present invention is not limited to the above embodiment. Various changes and modifications can be made within the spirit and scope of the invention.

Additional advantages and modifications will readily occur to those skilled in the art. Therefore, the invention in its broader aspects is not limited to the specific details, representative devices, and illustrated examples shown and described herein. Accordingly, various modifications may be made without departing from the spirit or scope of the general inventive concept as defined by the appended claims and their equivalents.

What is claimed is:

1. An electronic mail system comprising:

receiving and transmitting means for receiving an electronic mail having a message and a source address and for transmitting the electronic mail;

extracting means, operatively associated with the receiving and transmitting means, for automatically extracting the source address from the received electronic mail;

address storage means, operatively coupled to the extracting means, for storing a plurality of destination addresses, wherein the extracting means, upon extracting the source address from the received electronic mail, determines whether the extracted source address has already been stored in the address storage means and, if not, stores the extracted source address as one of the plurality of destination addresses;

message storage means, operatively coupled to the receiving and transmitting means, for storing a message to be transmitted;

selecting means, operatively associated with the receiving and transmitting means, for selecting one destination address from the plurality of destination addresses stored in the address storage means;

means, operatively coupled to the message storage means, for reading out the message from the message storage means, adding the selected one destination address to the message read out from the message storage means, and for causing the receiving and transmitting means to transmit electronic mail consisting of the selected destination address and the message read out from the message storage means to another electronic mail system;

generating means, operatively associated with the receiving and transmitting means, for generating reception frequency data corresponding to the extracted source address in response to the extraction of the source address by the extracting means, the reception frequency data being indicative of a number of receptions of electronic mail having the source address; and sorting means, operatively associated with the receiving and transmitting means, for sorting the destination addresses stored in the address storage means according to the reception frequency data.

2. A system according to claim 1, further comprising address input means for inputting another one of the plurality of destination addresses to the system, wherein the destination address input via the input means is stored by the address storage means.

3. A system according to claim 1, further comprising reception frequency data generating means for generating reception frequency data corresponding to the source address extracted by the extracting means, the reception frequency data being generated in response to the extracting of the source address by the extracting means, the reception frequency data being indicative of a number of electronic mail receptions in which the source address has been extracted by the extracting means.

4. A system according to claim 3, wherein the reception frequency data generating means includes means, when an identical destination address has already been stored in the address storage means, for updating the reception frequency data corresponding to the extracted source address.

5. A system according to claim 3, further comprising a display means for displaying the destination addresses stored in the address storage means, wherein the display means displays the stored destination address in an order based on the reception frequency data.

6. In an electronic mail system connected with another electronic mail system, the electronic mail system having an address memory storing a plurality of destination addresses therein and a message memory storing messages therein, an electronic mail transmission/reception method comprising the steps of:

receiving an electronic mail having a message and a source address;

extracting the source address from the received electronic mail automatically;

determining whether the extracted source address corresponds to at least one of the plurality of destination addresses stored in the address memory;

storing the extracted source address as one of the plurality of destination addresses in the address memory if it is determined in the determining step that the extracted source address does not correspond to at least one of the plurality of destination addresses already stored in the address memory;

storing a message to be transmitted in the message memory;

selecting a destination address corresponding to a location where the message is to be transmitted from the plurality of destination addresses stored in the address memory in accordance with an input command;

reading out the message from the message memory;

adding the destination address selected in the selecting step to the readout message;

transmitting an electronic mail consisting of the destination address selected in the selecting step and the message read out from the message memory to another electronic mail system;

generating reception frequency data corresponding to the extracted source address, the reception frequency data being indicative of a number of receptions of electronic mail having the source address; and sorting the destination addresses stored in the address memory according to the reception frequency data.

7. A method according to claim 6, further comprising a step of displaying the destination addresses stored in the address memory on a display device.

8. A method according to claim 6, further comprising the steps of inputting a destination address, and storing the input destination address in the address memory.

9. A method according to claim 6, further comprising the steps of:

generating reception frequency data in response to the extracting of the source address, the reception frequency data being indicative of a number of electronic mail receptions in which the source address has been extracted; and storing the reception frequency data in the address memory, wherein the destination addresses and reception frequency data are stored in the address memory in one-to-one correspondence.

10. A method according to claim 9, further comprising a step of displaying the destination addresses stored in the address memory on a display device in an order based on the reception frequency data.

11. A method according to claim 9, wherein the generating step includes the step of, in the event that an identical destination address has already been stored in the address memory during the determining step, updating the reception frequency data corresponding to the extracted source address.

12. An electronic mail system comprising:

receiving and transmitting means for receiving an electronic mail having a message and a source address and for transmitting the electronic mail;

a first address memory storing a plurality of destination addresses, the first address memory being operatively coupled to the receiving and transmitting means;

extracting means, operatively associated with the receiving and transmitting means, for automatically extracting the source address from the received electronic mail in response to the reception of the electronic mail by the receiving and transmitting means, for determining whether the extracted source address corresponds to at least one of the plurality of destination addresses stored in the first address memory and, if not, storing the extracted source address as one of the plurality of destination addresses in the first address memory;

generating means, operatively associated with the receiving and transmitting means, for generating reception frequency data corresponding to the extracted source address in response to the extraction of the source address by the extracting means, the reception frequency data being indicative of a number of receptions of electronic mail having the source address;

sorting means, operatively associated with the receiving and transmitting means, for sorting the destination addresses stored in the first address memory according to the reception frequency data;

a message memory storing a message to be transmitted, the message memory being operatively coupled to the receiving and transmitting means;

address input means for inputting a destination address and group data designating the destination addresses as corresponding to a group;

a second address memory for storing the input destination addresses and the group data;

first display means for displaying the input destination addresses stored in the second address memory in an order that is based on the group data;

second display means for displaying the sorted destination addresses stored in the first address memory;

selecting means for selecting one destination address from the displayed destination address; and means, operatively coupled to the message memory, for reading out the message from the message memory, for adding the selected destination address to the readout message, and for causing the receiving and transmitting means to transmit an electronic mail having the selected address and the readout message to another electronic mail system.

13. An electronic mail system comprising:

receiving and transmitting means for receiving an electronic mail having a message and a source address and for transmitting the electronic mail;

extracting means, operatively associated with the receiving and transmitting means, for automatically extracting the source address from the received electronic mail;

address storage means, operatively coupled to the extracting means, for storing a plurality of destination addresses, wherein the extracting means, upon extracting the source address from the received electronic mail, determines whether the extracted source address has already been stored in the address storage means and, if not, stores the extracted source address as one of the plurality of destination addresses;

message storage means, operatively coupled to the receiving and transmitting means, for storing a message to be transmitted;

selecting means, operatively associated with the receiving and transmitting means, for selecting one destination address from the plurality of destination addresses stored in the address storage means;

means, operatively coupled to the message storage means, for reading out the message from the message storage means, adding the selected one destination address to the message read out from the message storage means, and for causing the receiving and transmitting means to transmit electronic mail consisting of the selected destination address and the message read out from the message storage means to another electronic mail system;

reception frequency data generating means for generating reception frequency data corresponding to the source address extracted by the extracting means, the reception frequency data being generated in response to the extracting of the source address by the extracting means, the reception frequency data being indicative of a number of electronic mail receptions in which the source address has been extracted by the extracting means, and, when an identical destination address has already been stored in the address storage means, for updating the reception frequency data corresponding to the extracted source address;

sorting means, operatively associated with the receiving and transmitting means, for sorting the destination addresses stored in the address storage means according to the reception frequency data; and display means for displaying the destination addresses stored in the address storage means, wherein the display means displays the stored destination address in an order based on the reception frequency data.

* * * * *